United States Patent Office 2,709,343
Patented May 31, 1955

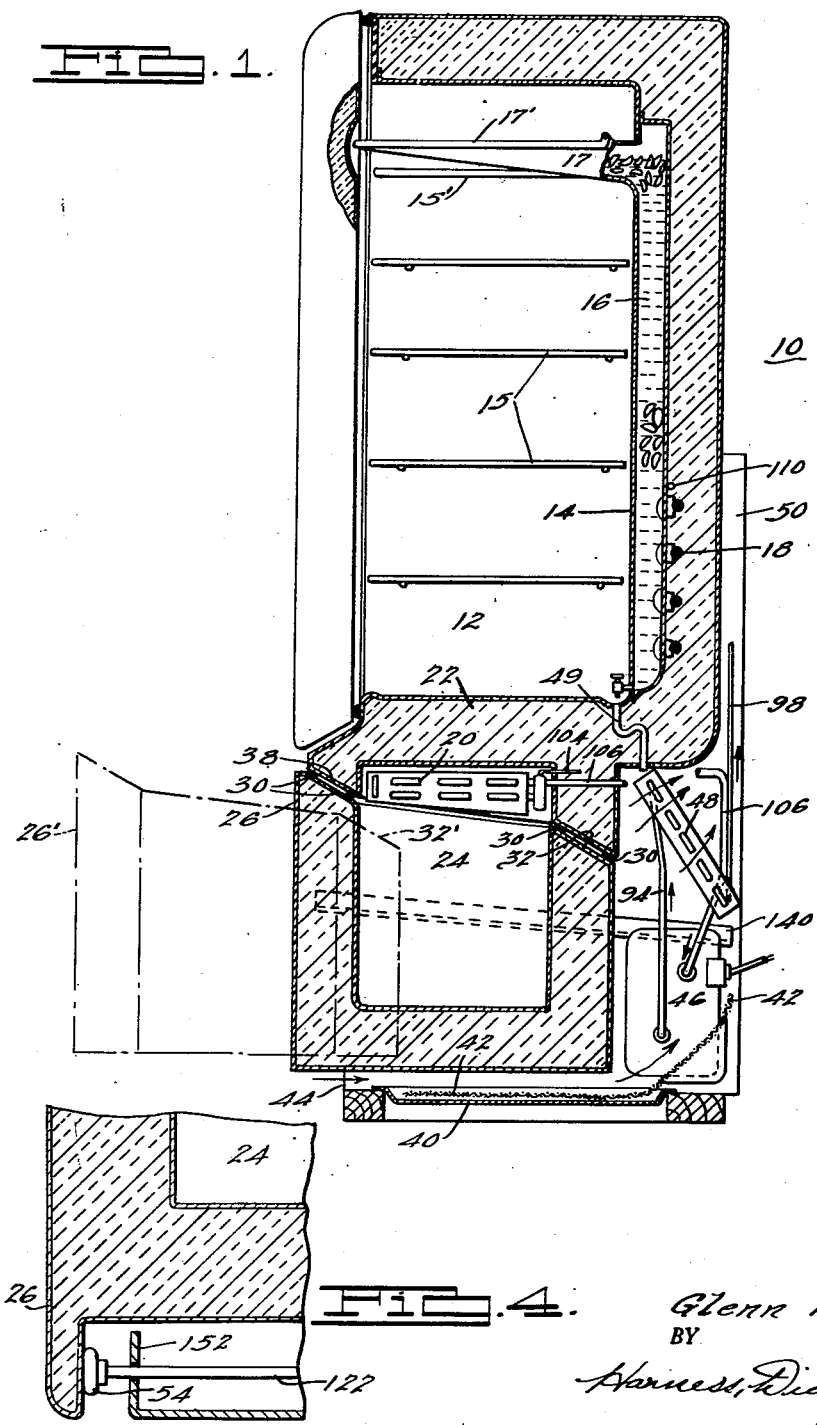

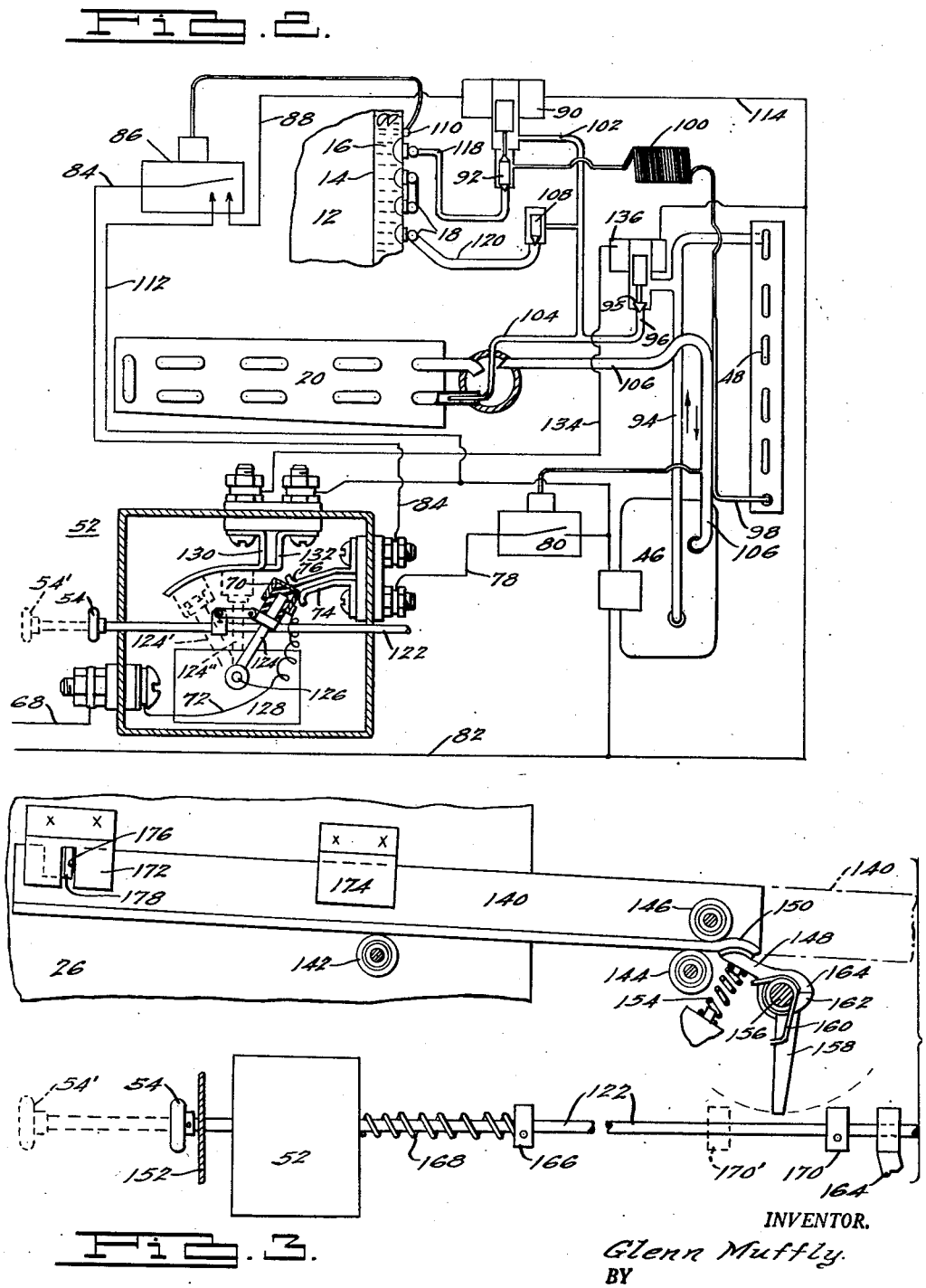

2,709,343

DEFROSTING MEANS FOR REFRIGERATION APPARATUS

Glenn Muffly, Springfield, Ohio

Application February 4, 1949, Serial No. 74,528

11 Claims. (Cl. 62—103)

This application discloses an improved method of defrosting somewhat similar to that disclosed in my copending application Serial No. 767,731 filed August 9, 1947, now Patent No. 2,641,112, but designed specifically for application to a household refrigerator whereas the copending application above mentioned refers in particular to a commercial type of refrigerator for storing packages of frozen foods.

In the said copending application I have disclosed means for moving the evaporator relative to the insulated container for the frozen foods. The method employed herein is an improvement wherein means is provided for moving the insulated container in which frozen foods are stored instead of moving the evaporator for the purpose of preventing drippage of defrost water on the frozen foods while defrosting the evaporator.

My earlier application refers particularly to the "well-type" or "top-opening" freezer. In household refrigerators it is found desirable to employ a front-opening or drawer-type freezer. One disadvantage of the front-opening type of freezer is that when the door is opened room air flows into and out of the freezing compartment and deposits moisture on the walls, on the cooling surfaces of the freezer and on foods stored in the freezer. In the well-type or drawer-type freezer this spillage of cold air and entry of warm air, with the resulting condensation and freezing of moisture on the foods, is avoided, but most drawer-type freezers have employed non-insulated drawers located within insulated walls so that when a drawer is pulled out to afford access to the foods the contents of the drawer are not protected by insulation on the sides nor bottom. In the present disclosure I show a drawer which is insulated on four sides and the bottom so that when the drawer is pulled out for access to the foods contained therein it is substantially as well protected from heat infiltration through its front, back, sides and bottom as when the drawer is closed. Due to the fact that cold air is heavier than warm air, there is very little flow of warm air into the open drawer. Another factor which reduces the flow of air into and out of the drawer is found in the arrangement whereby the air surrounding the drawer is open to the room, thus the opening of the drawer does not produce a pumping effect on the air such as is ordinarily experienced in drawer-type cabinets.

The arrangement for defrosting the evaporator which cools the frozen food space is needed to overcome a serious objection raised by users of the present new models of household refrigerators in which two separately insulated and separately cooled compartments are provided, one for the storage of foods above 32° and one for the storage of frozen foods. It has become common practice to cool the warmer of these compartments through the medium of its liner. The freezing compartment is also sometimes cooled through the medium of its liner, but whether cooled in this manner or by means of an exposed evaporator it is impossible to properly defrost the freezing compartment without removing the frozen foods, which are thus exposed to warmer air so that they start to thaw or at least collect moisture from ambient air. The present invention provides in addition to the nonfrosting main food compartment a convenient means for defrosting the frozen food compartment without disturbing or damaging the foods stored therein.

An object of this invention is to provide for defrosting the evaporator of a freezing compartment in a household refrigerator without disturbing the foods stored in this compartment.

Another object is to make better use of the usually wasted space below the main food compartment of a household refrigerator and in front of the condensing unit.

Still another object is to provide for automatic disposal of drip water resulting from the defrosting of the freezer evaporator.

Still another object is to provide against any drippage of defrost water or ice from the evaporator into the frozen food compartment.

A still further object is to provide for defrosting the freezer evaporator without interrupting the cooling of the main food compartment nor the making of ice.

An additional object is to provide for cooling the uppermost portion of the main food compartment to a somewhat higher temperature than the balance of the main food compartment.

Still another object is to provide a small shelf near the top of the main food compartment for the storage of butter and other products in a somewhat higher temperature zone.

An additional object is to avoid the cooling of the top of the liner of the main food compartment, thus avoiding the drippage of moisture from the top of the liner.

A still further object is to allow the use of a flat upper wall of the main food compartment liner so that bottles of maximum height may be placed on the uppermost full-width shelf at its extreme rear, thus providing for the storage of taller bottles at the rear of the shelf.

In the drawings:

Figure 1 is a vertical sectional view from the right side of a household refrigerator showing the frozen food compartment and its evaporator.

Figure 2 is a diagrammatic view of the refrigerating system and controls used in Figure 1.

Figure 3 is a sectional view of the base of the cabinet showing the drawer slide and latch mechanism.

Figure 4 is a horizontal section of the drawer and cabinet base, showing the knob of the defrost control device.

Referring to Figure 1 which shows the household refrigerator 10 in vertical section, the main food space 12 is preferably cooled by non-frosting surfaces such as the rear wall 14 of the liner and is provided with shelves 15 and 15'. The wall 14 is shown as a portion of the ice maker tank 16 in which ice is made and released by the method shown in several of my issued patents and copending applications, for example U. S. Patents Nos. 2,145,773, 2,145,774, 2,145,775, 2,145,777, 2,291,826, 2,359,780, 2,368,675 and U. S. applications S. N. 533,778 filed May 2, 1944, now Patent No. 2,496,304, S. N. 569,132 filed December 21, 1944, now Patent No. 2,572,508, S. N. 633,371 filed October 3, 1941, now Patent No. 2,544,394, S. N. 616,523 filed September 15, 1945, now Patent No. 2,562,811, S. N. 771,181 filed August 29, 1947, now Patent No. 2,641,109, S. N. 33,179 filed June 15, 1948, now Patent No. 2,656,689 and S. N. 50,101 filed September 20, 1948, now Patent No. 2,672,016. The ice delivery spout 17 extends forward from the tank 16 and is provided with a hinged cover 17', as shown in my copending application Serial No. 771,181 filed August 29, 1947, now Patent No. 2,641,109. The evaporator 18 is employed to make and release ice, which is stored within the tank 16, thereby providing a supply of ice and the means for cooling the space 12.

A second evaporator 20 is located below the insulated wall 22 and arranged to operate at a temperature far below freezing so as to cool the space 24 within the drawer 26 to the desired temperature, which may be in the neighborhood of 0° F.

The cabinet is fitted with gaskets 30 which seal the drawer 26 to the body of the cabinet. These gaskets also seal the side walls of the drawer to the cabinet so that when the drawer is closed it forms a substantially air-tight compartment 24 for the storage of frozen foods. This drawer is preferably mounted on rollers and slides so that it can be pulled out almost its full depth as indicated in dotted lines at 26'. When in the open position the angular edge 32 assumes the position 32' below the angular bottom 38 of the cabinet wall so that any water dripping from the fin-type evaporator 20 will fall into the drip pan 40 in which an absorbent pad 42 is shown. This pad extends upwardly so as to be contacted by room air which is drawn in through the opening 44 at the front of the base of the refrigerator, flows over the pan 40 and the pad 42, over the motor-compressor unit 46 and then over the condenser 48. Such circulation of air is induced by the high temperature of the condenser hence it is not necessary to employ a fan and a separate motor to produce the desired air circulation.

While it is permissible to have the evaporators 18 and 20 operated at the same pressure and therefore at the same temperature it may, for economy of power consumption, be desired to operate the evaporator 18 at a higher pressure and to continue its operation while the evaporator 20 is being defrosted. I have shown various means for operating two evaporators at the same or different temperatures in my previous patents and copending applications.

Since the space 12 is cooled by nonfrosting surfaces, preferably by the liner 14, there will be only dew and no frost collected on the liner. The drain tube 49 includes a suitable trap and is arranged to conduct such condensate to the condenser 48, to the motor-compressor unit 46 or to the upwardly extending portion of the fabric 42.

The evaporator 20 is defrosted by means of hot gas from the condenser 48 and from the compressor of the unit 46 while the drawer is in the open position 26'. Such defrosting may be controlled by a solenoid valve or valves. These valves will ordinarily rest in the position for normal refrigeration of evaporators 18 and 20 either simultaneously or separately according to the designer's choice.

The drawer 26 must remain in its open position during the defrosting period, which may be 5 or 10 minutes, but there is substantially no air flow into and out of the insulated drawer, hence no material loss of refrigeration nor warming of the frozen foods.

It will be noted that the front of the drawer 26 is higher than its rear wall so that the rear wall of the drawer passes below the evaporator 20 when the drawer is opened but the crack between the drawer front and the fixed angular portion 38 of the refrigerator body is at a higher level than the bottom edge of the fins of the evaporator 20. The evaporator 20 is located very close to the crack between the cabinet body and the drawer. Air leaking in through this crack is light because of its temperature and moisture content, hence flows into contact with or very near to the evaporator before it makes contact with any of the food stored within the space 24. This results in cooling the air and condensing moisture from it before the air contacts any of the foods stored in the freezer drawer. While the fins cannot extend below the top of the back of the drawer, it will be noted that there are two gaskets 30 for this joint so that the air leakage is very small. These gaskets also seal the sides of the drawer to the insulated walls of the cabinet and adjacent each such joint the evaporator 20 collects moisture in the form of frost, thus dehydrating the air before it makes contact with the foods stored in the drawer.

The motor-compressor unit 46 preferably has one small horizontal dimension, as in certain recently announced models, so that the front to back dimension of the condensing unit compartment can be minimized and a greater amount of space made available for the drawer 26. The condenser 48 may optionally be located in the vertical flue 50 instead of in the angular position shown, thus allowing room for a still larger drawer 26. Optionally a fixed shield or wall may be provided between the drawer and the condensing unit to further reduce heat transfer from the condensing unit to the drawer and its junction with the cabinet body.

Figure 2 shows electrical and refrigerant circuits suitable for use in Figure 1. The defrosting switch 52 is connected with a solenoid valve so as to start defrosting when the knob 54 of switch 52 is pulled outwardly. The defrosting switch 52 may be actuated automatically when the drawer 26 is pulled out to its extreme position 26', but this is not necessary and may not be considered desirable because the user might withdraw the drawer its full distance and inadvertently cause the evaporator 20 to defrost when not desired. I prefer to allow the user to actuate the knob 54 by hand when it is desired to defrost the evaporator 20 of the freezer. This knob is preferably arranged so that it cannot be pulled out unless the drawer is open. In ordinary usage the drawer 26 is not open for more than a fraction of a minute at a time for taking food out or putting it in. During this time the evaporator 20 may be active but the resulting loss of refrigerating effect is negligible and it prevents defrosting at inopportune times.

The switch mechanism 52 includes details as follows: Circuit from line conductor 68 is carried to the movable insulated contact member 70 by means of the flexible wire 72. This contact member is shown touching the two flexible contact members 74 and 76. The contact member 74 is connected by means of the wire 78 with the switch 80 which is arranged to close in response to a pressure or temperature rise in the evaporator 20, thereby energizing the motor of unit 46 with which line conductor 82 is permanently connected. The member 70 is also touching the spring contact member 76 which is connected with the wire 84 leading to the ice maker switch 86 now assumed to be open so that no current flows through the wire 88 to the solenoid 90, thus the valve 92 is at rest in the position shown, which closes the inlet to the ice maker evaporator 18. In this position of the valve 92 high pressure vapor discharged from the motor-compressor unit 46 flows through the tube 94 to the top of the condenser 48, being prevented by the closed valve 95 from entering the by-pass tube 96. Refrigerant liquefied in the condenser 48 flows through the liquid tube 98 and the restrictor 100 to the solenoid valve 92 which is in the position shown, thus causing the liquid refrigerant, now under low pressure to flow through the tubes 102 and 104 to the freezer evaporator 20. Refrigerant vapor leaving the evaporator 20 flows through the suction tube 106 back to the motor-compressor unit 46. It will be noted that the check valve 108 prevents flow of low-pressure refrigerant liquid to the evaporator 18.

So long as the freezer switch 80 remains closed and the ice maker switch 86 remains open operation will continue as above until the freezer evaporator drops to its cutout temperature or pressure at which time the switch 80 opens and the motor-compressor unit 46 stops. If, however, the ice maker switch 86 has closed in response to a rise of temperature of the bulb 110 before the freezer switch 80 reopens, the operation will be as follows: Current continues to flow through the motor of unit 46 as before although the closing of switch 86 has provided an additional path for parallel flow of current from the line 68 through wires 84 and 112 to the same motor. In addition the closing of ice maker switch 86 has provided a parallel path for current flow from the wire 84 through the wire 88 to the solenoid 90 which is connected through the wire 114 to the other conductor 82 of the line. The energizing of solenoid 90 causes the valve 92 to lift, thereby diverting flow of low-pressure refrigerant liquid so that it now flows from the restrictor 100 to the tube 118 which feeds the ice maker evaporator 18 instead of through tubes 102 and 104 to evaporator 18. The mixture of refrigerant liquid and vapor leaving the evaporator 18 through the tube 120 lifts the check valve 108 and passes through the tube 104 to the freezer evaporator 20 from which vapor flows through the tube 106 back to the suction side of the compressor in the unit 46. This results in cooling both the ice maker evaporator 18 and the freezer evaporator 20. If desired the check valve 108 may be weighted so that the evaporating pressure in the freezer evaporator 20 is lower than that in the ice maker evaporator 18, but this is not necessary if the main food space is cooled by the type of ice maker shown, which prevents any frost formation or undue dehydration of air in the main food space.

In the event that the freezer switch 80 reopens before the ice maker has been cooled to the temperature at which the switch 86 reopens, this operation will continue, but if the ice maker switch 86 reopens first the solenoid 90 will be deenergized and operation will continue as first described, cooling the freezer evaporator 20 only. The result is that the ice maker evaporator starts and stops operation in response to changes of temperature of the bulb 110, causing ice to be formed and released as described in earlier patents and applications of mine as noted above. This operation of the ice maker is the same as if there were no freezer evaporator 20. During operation of the ice maker evaporator 18, the evaporator 20 is also active, which may result in reducing the temperature of the evaporator 20 to a lower point than that at which its switch 80 opens, but this does no harm. If, however, the evaporator 20 requires further cooling after the ice maker evaporator 18 is cut out the cooling of evaporator 20 will continue until the switch 80 reopens. In the event that the ice maker tank 16 is full of floating ice down to the level at which this ice maintains the bulb 110 at a temperature below the cut-in point of the switch 86 and the temperature-pressure of the freezer evaporator 20 rises to the cut-in point of switch 80 the freezer may be cooled without cooling the ice maker. It is thus possible that a complete cycle of freezer cooling may occur without cooling the ice maker evaporator 18, but whenever the evaporator 18 is cooled the evaporator 20 is also cooled.

When the user desires to defrost the evaporator 20 she pulls the drawer 26 out to its full open position 26' and also pulls the knob 54 out to its position 54'. This knob connects by means of the rod 122 with the switch arm 124 which is thereby moved to the position 124'. This movement of the arm 124 rotates the shaft 126 on which it is mounted, thereby energizing the clock mechanism 128 which controls the return movement of the arm 124 so that it takes a predetermined length of time to travel from the position 124' to the position 124" at which point the arm 124 snaps back to the position shown by solid lines in Figure 2, where contact is remade with the members 74 and 76. At the time that the knob 54 is pulled outwardly contact is first broken with the spring members 74 and 76 and then made with the spring contacts 130 and 132. The reclosing of the circuit from movable contact 70 to the spring contact 132 continues operation of the motor-compressor unit 46. At the same time the contact made between the movable member 70 and the spring contact 130 closes a circuit through the wire 134 and the solenoid 136 back to the other side of the line thereby causing the valve 95 to lift and allow high pressure refrigerant vapor to flow from the discharge tube 94 through the by-pass tube 96 to the freezer evaporator 20. This high pressure refrigerant vapor is prevented from entering the evaporator 18 by means of the check valve 108 and by the fact that the solenoid 90 is de-energized so that the valve 92 closes the port leading to the tube 118. The hot refrigerant vapor causes defrosting of the evaporator 20 and returns at a reduced temperature through the suction tube 106 to the motor-compressor unit 46, where it is reheated by the motor and by the compressor which recirculates it.

When the clock mechanism allows the contact arm 124 to snap from the position 124" to the solid line position shown in Figure 2, the circuit is reclosed through the switch 80, which is now closed because of the increased temperature and pressure of the evaporator 20 due to the defrosting operation, hence evaporator 20 immediately starts to cool when the timed defrosting operation has been completed. In the event that the ice maker switch 86 is closed at the time the defrosting operation is completed the evaporator 18 will also be cooled immediately after the defrosting operation is completed, but in any event the freezer evaporator 20 is always refrigerated immediately after defrosting. While the drawer is closed the switch 80 closes before evaporator 20 reaches 32° F.

The operation of switch 52 by means of the knob 54 to initiate defrosting is preferably manual and may be accomplished upon opening of the drawer 26 which open drawer position provides that the defrost water from the evaporator 20 will fall into the pan 40 and not into the frozen food space 24. If desired a clock-actuated mechanism may be provided for opening the drawer 26 and moving the switch arm 124 at midnight or some convenient time. In any event it is preferred that automatic means be provided which upon closing of the drawer 26 will automatically stop the defrosting operation, for example, the front of the drawer 26 strikes the knob when in the position 54' and returns it to the position 54. In the absence of any automatic actuation of the switch 52 as provided by the clock mechanism 128 the termination of the defrosting operation is accomplished by the user pushing the drawer 26 to its closed position. In the event that the clock mechanism is used, but no automatic means is provided for reclosing the drawer the defrosting preferably would be done while the housewife is in the kitchen so that the open drawer serves as a reminder that it should be closed after the knob 54 has snapped back to its normal position. If the clock mechanism is not employed such open drawer reminds the user to reclose the drawer after sufficient time has elapsed to complete the defrosting operation. As stated before, such closure of the drawer stops the defrosting.

An arrangement for automatically reclosing the drawer 26 when the defrosting operation is completed is seen in Figure 3. The drawer 26 is removably attached to a pair of angle irons 140 which are slightly inclined and supported by the rollers 142, 144 and 146, which are mounted on the main body of the cabinet and preferably provided with ball or roller bearings. When the drawer is opened it is thus lifted slightly so that gravity tends to reclose the drawer. The spring-actuated pawl 148 engages the notch 150 in one of the angle members 140 thus normally retaining the drawer in its open position, but a slight push on the drawer or movement of the pawl 148 will cause the drawer to be reclosed by gravity. To reduce the push required to start the closing of the drawer and reduce friction so the drawer will close with less inclination of 140, the pawl 148 may be fitted with a roller which engages the notch 150.

The pawl 148 will maintain the drawer 26 in its open position for removal of frozen foods since in opening the drawer the user will normally pull the drawer out to its full open position so that the pawl 148 engages the depression 150 in the track 140 in which position the pawl is retained by the spring 154 with sufficient force to prevent the drawer from reclosing under the action of gravity.

Either mechanical or electrical means may be provided for momentarily releasing the pawl 148 coincidentally with the return of switch 52 to its normal position, thus the user has only to open the drawer and pull out the knob 54 when she desires to defrost the freezer evaporator. Upon completion of the defrosting operation the switch returns to its normal position and the drawer recloses. This insures against any damage to the frozen food resulting from the user forgetting to reclose the drawer and permits of defrosting during periods when the user is to be away subsequent to the initiation of the defrosting.

One arrangement for accomplishing the above result is illustrated in Figure 3. The switch mechanism 52 is here assumed to be located on the cabinet body at the right-hand side of the drawer below the right hand slide 140 and the rollers with the rod 122 extending forward through the in-turned flange 152 of the near side of the outer casing of the cabinet so that when the drawer is closed the flange portion of the drawer front (seen in Fig. 4) hides the knob 54 and pushes it to this position in the event that the knob was pulled out to the position 54' prior to the closing of the drawer.

The pawl 148 is pivoted to the cabinet body by means of the pin 156 on which is also mounted the lever 158. This lever is free to move clockwise relative to the pawl against the force of spring 160, which normally urges it in counterclockwise direction until the shoulder 162 of the arm 158 strikes the shoulder 164 of the pawl. It is thus seen that the arm 158 may be rotated clockwise against the action of the spring 160 without moving the pawl, but if the arm 158 is rotated counterclockwise for example upon movement of the rod 22 as will be explained below, its shoulder 162 and the shoulder 164 of the pawl cooperate to cause the pawl to be withdrawn from the recess 150 of the drawer slide, thus allowing the drawer to be reclosed by gravity. The form of the pawl 148, the form of the recess 150 and the strength of the spring 154 are so related that sufficient resistance is provided to drawer movement to prevent the drawer from reclosing, but this resistance is light enough to allow the drawer to reclose under the action of gravity if given a slight inward push or if the pawl is momentarily moved out of the recess 150.

As stated above, the rod 122 of the switch mechanism 52 extends rearwardly as shown in Figure 3 and is freely slidable in its supporting member 164 attached to the cabinet body. This rod is provided with a collar 166 fixed thereto and is urged rearwardly (to the right in Figure 3) by the spring 168 which tends to move the knob from the position 54' to the position 54. This rod also carries a collar 170 which is fixed to the rod so that it moves from the position 170 to the position 170' when the knob 54 is moved to the position 54'. At the start of the defrosting period this collar will be located at 170' and will gradually approach the arm 158 as defrosting progresses. At the end of the defrosting period the rod 122 is suddenly released and the spring 168 moves it rearwardly (to the right in Fig. 3) so that the collar 170 engages the arm 158 and rotates the pawl from contact with the notch 150 in drawer guide 140. The collar 170 then passes beyond the reach of the arm 158, allowing the pawl to again contact the drawer slide 140 after the drawer has started to move inwardly so that the pawl no longer engages the recess 150 in position to stop the drawer movement. It is thus seen that the ending of the defrost period results in the release of the drawer so that gravity closes it. If desired, an air, friction or spring stop may be provided to keep the drawer from slamming shut too violently.

The pawl 148 may be held in its releasing position for a few seconds to allow more time for the drawer to reclose or start reclosing if desired. This can be done by locating the collar 170 on the rod 122 so that it engages the lever 158 a few seconds before the clock mechanism 128 releases the arm 124. The snap action which moves collar 170 beyond the lever 158 to stop the defrosting and release the pawl will then occur when the drawer has closed to the point where its front strikes the knob 54 and moves the rod 122 to the position shown by solid lines in Fig. 3. This arrangement also provides a cushioning effect for the closing of the drawer as a certain amount of energy will be absorbed in moving the rod 122 prior to its release by the clock mechanism 128. This shock absorbing effect can be increased by making the knob 54 of rubber or other compressible material or by mounting a short coil spring on the back of the knob to strike the cabinet front at the end of the inward movement of the rod 122.

It should be noted that the drawer is heavily insulated on four sides and its bottom, thus the cold air in the drawer, being heavier that room air because of its low temperature, does not spill out of the drawer when open. An open top insulated container of this type will keep frozen food in good condition for several hours even when open at the top and not refrigerated, assuming that the temperature of the frozen food contained therein was low enough to start with.

In order to provide access to the controls and the condensing unit the drawer 26 is preferably arranged for easy removal from the cabinet. The drawer is provided on each side with a pair of sheet metal members 172 and 174 by means of which it is supported on the longitudinal members 140. One set of said members 172 and 174 for one side of the drawer is shown in Fig. 3. It will be understood that the other set is a duplicate of the set shown. There is a slide 140 on each side of the drawer, but pawl 148 and associated parts do not need to be duplicated. The slide 140 not shown is a mirror equivalent of the one shown. When the drawer is pulled out to the position 26' it can be lifted off of the slides 140. When replaced thereon the notches 176 in clips 172 and the outwardly turned lugs 178 of the slides 140 provide for locking the slides in position on the drawer.

It will be understood that the clock mechanism 128 may actuate the switch arm 124 directly as shown in Figure 2 or may merely release the pawl 148 shown in Figure 3. In the latter case the gravitational reclosing of the drawer 26 automatically returns the knob 54 to its normal position and stops the defrosting operation. If it is desired to let the clock stop the defrosting without reclosing the drawer, the rod 122 may be arranged to actuate a signal instead of releasing the pawl. If only the signal is actuated by the clock, defrosting stops when the user recloses the drawer.

In other of my copending patent applications, for instance in S. N. 771,181 filed August 29, 1947, now Patent No. 2,641,109, I have shown control devices for selectively cooling the freezer evaporator or the ice maker (main food space) evaporator, one at a time. Whereas the present disclosure shows a system in which the freezer is at times separately cooled and is coincidentally cooled while the warmer evaporator 18 is active, my previously disclosed methods may be employed in connection with this method for automatic defrosting of the freezer evaporator. Some of my control devices will allow for operation of the evaporator 18 while defrosting evaporator 20. For instance the solenoid valve of Fig. 3 in my copending application Serial No. 45,343, now Patent No. 2,654,227, could be used to cause evaporator 20 to act as a condenser while evaporator 18 continues to operate as an evaporator. It will also be understood that either of the methods of defrosting a low-temperature evaporator by means of reversing the action of the compressor or applying heat electrically to the refrigerant, as disclosed in my copending application Serial No. 767,731 filed August 9, 1947, now Patent No. 2,641,112, may be employed in connection with the present disclosures.

In the last mentioned copending application, the evaporator is moved to a defrosting position whereas in the present application the insulated drawer is moved for the purpose of defrosting. In both cases, there is a relative movement between the evaporator and the insulated container in which foods are stored. The earlier application is directed particularly to cabinets having a top opening whereas the present application refers in particular to cabinets having two zones refrigerated to different temperatures or to cabinets having one or more insulated drawers for the storage of foods.

The pan 40 is made of sufficient depth to hold the maximum amount of water that can accumulate in the form of frost on the evaporator 20. The front of the drawer 26 is preferably made the full width of the cabinet whereas the width of the drawer is such as to allow space for the slides 140 and associated parts, thus the drawer front covers the knob 54 so that the drawer must be opened before the knob is pulled out.

While the drawer 26 is here shown as located in the lower portion of a household refrigerator cabinet, it will be understood that there may be several such drawers, as in a large locker cabinet and that the defrosting may be individually controlled for each drawer or defrosting initiated when a group of drawers are pulled out.

The heat for defrosting is herein shown as derived from high pressure refrigerant vapor, but it will be understood that most of the features of this invention are attainable when electrical heat is used for defrosting, heat is obtained from water which has been warmed by a water cooled condenser or some other source of heat is provided either internally or externally of the evaporator 20 to defrost it. One alternative method is to use electrical heat in a secondary refrigerant circuit as disclosed in my copending application Serial No. 767,731, now Patent No. 2,641,112. In the application just mentioned and in the present application, it will be noted that the evaporator is exposed to ambient air during the defrosting period, thus providing another source of heat for defrosting.

A separate signal may be provided to indicate that the defrosting operation is going on or that it has been completed. In the foregoing specification, it will be noted that the knob 54 remains in the position 54' during the defrosting operation hence the automatic return of the knob to its normal position 54 is a signal that the defrosting operation has been completed while the location of the knob in the position of 54' is a signal that the defrosting operation is still going on.

What I claim is:

1. A refrigerator cabinet, a refrigerating system for cooling said cabinet, an insulated drawer in said cabinet providing storage space for a product to be cooled, an evaporator included in said system and rigidly mounted in said cabinet above said drawer in position to cool said space when the drawer is closed, a control mechanism operable to cause defrosting of said evaporator only while said drawer is open, and a drip collector located below the closed position of said drawer to receive defrost water dripping from said evaporator while defrosting, these elements being assembled in such relationships to each other that defrost water is caused to by-pass said storage space.

2. A refrigerator, a refrigerating system for cooling said refrigerator, a drawer having its side and bottom walls insulated, an evaporator of said system fixed to said refrigerator above the closed position of said drawer and operable at a temperature below the freezing point of water for cooling said drawer, means associated with said system for applying artificial heat to defrost said evaporator operable only while said drawer is open, and means actuated by the closing of said drawer for terminating the operation of said defrosting means.

3. In a refrigerator, a drawer comprising insulated walls defining a storage space, means fixed in said refrigerator above the closed position of said drawer for cooling said space, means independent of ambient temperature and operable only while said drawer is open for heating said cooling means to defrost it, and means actuated by the reclosing of said drawer to stop said heating means and restart the cooling of said cooling means.

4. In a refrigerator, a space for the storage of a product to be cooled, means for cooling said space, defrosting means for said cooling means, self-actuating closure means for said space, means for retaining said closure means in an open position, control means for releasing said retaining means to allow said closure means to reclose said space at the completion of the defrosting operation, and means actuated by the movement of said closure means for stopping the defrosting operation.

5. In a refrigerator, a drawer, an evaporator located above said drawer, means for defrosting said evaporator by the application of artificial heat, said means being operable only while said drawer is open to move its contents out of the path of defrost water, and control means actuated by the reclosing of said drawer to stop said defrosting and restart the cooling of said evaporator.

6. In a refrigerator, a drawer, an evaporator located above said drawer to cool it, a drip receiver located below the closed position of said drawer, and a control device operable only when said drawer is horizontally displaced from its normal position below said evaporator to cause defrosting of said evaporator.

7. In a refrigerator, an evaporator fixedly supported by the main body of said refrigerator, means for cooling said evaporator to below 32° F., a drawer located below said evaporator and adapted for the storage of food products cooled by said evaporator, said drawer having an insulated bottom and four insulated side walls, defrosting apparatus including means fixed to said main body for supplying artificial heat to said evaporator, and a control for terminating defrosting in response to the closing of said drawer, said control acting coincidentally with said termination of defrosting to restart the cooling of said evaporator.

8. In a refrigerator, a drawer including insulated side and bottom walls, an evaporator located in a fixed position above the closed position of said drawer to cool it, and apparatus for applying artificial heat to said evaporator to defrost it, the operation of said apparatus being made possible by movement of said drawer from its closed position below said evaporator.

9. In a refrigerator cabinet, an upper section comprising insulated walls enclosing a food compartment, said cabinet having a non-insulated base portion below said upper section, an insulated drawer located in said base portion, a refrigerating system, an evaporator of said system located in a recess in the bottom of the lowermost insulated wall of said upper section to cool said drawer, said drawer along with its bottom, front, rear and side insulated walls being movable relative to the upper portion of said cabinet, a drip pan located in said base portion, and heating apparatus operable only when said drawer is moved from its normal position to defrost said evaporator so that defrost water therefrom falls into drip pan.

10. In a refrigerator, a drawer, means for cooling the interior of said drawer, means operable when said drawer is open for defrosting said cooling means, means energized by the opening of said drawer to supply power for reclosing it, retaining means for holding said drawer in its open position, and a control device arranged to stop said defrosting operation and release said retaining means.

11. The structure of claim 10 wherein retaining means is also adapted to be released in response to a slight manually applied force.

References Cited in the file of this patent

UNITED STATES PATENTS

| | | |
|---|---|---|
| Re. 14,885 | Willsie | June 15, 1920 |
| 504,986 | Kurtz | Sept. 12, 1893 |
| 1,238,514 | Harbeck | Aug. 28, 1917 |
| 1,796,828 | Clingman | Mar. 17, 1931 |
| 1,840,475 | Starr | Jan. 12, 1932 |

(Other references on following page)

UNITED STATES PATENTS

| Number | Name | Date |
|---|---|---|
| 1,948,312 | Phillips | Feb. 20, 1934 |
| 1,952,422 | Copeman | Mar. 27, 1934 |
| 2,069,481 | Rott | Feb. 2, 1937 |
| 2,071,148 | Weisberg | Feb. 16, 1937 |
| 2,101,512 | Rulon | Dec. 7, 1937 |
| 2,112,261 | Backstrom | Mar. 29, 1938 |
| 2,124,268 | Williams | July 19, 1938 |
| 2,126,285 | Schaaf | Aug. 9, 1938 |
| 2,189,177 | Kirshner | Feb. 6, 1940 |
| 2,209,431 | Tull | July 30, 1940 |
| 2,229,569 | Hoesel | Jan. 21, 1941 |
| 2,300,085 | Yunker | Oct. 27, 1942 |
| 2,303,137 | Philipp | Nov. 24, 1942 |
| 2,303,138 | Philipp | Nov. 24, 1942 |
| 2,318,532 | Scott | May 4, 1943 |
| 2,324,309 | McCloy | July 13, 1943 |
| 2,385,525 | McCloy | Sept. 25, 1945 |
| 2,399,963 | Vinton | May 7, 1946 |
| 2,399,967 | West | May 7, 1946 |
| 2,401,613 | Charland | June 4, 1946 |
| 2,426,578 | Tobey | Aug. 26, 1947 |
| 2,433,655 | Di Zappola | Dec. 30, 1947 |
| 2,443,787 | Earle | June 22, 1948 |
| 2,450,844 | Stuart | Oct. 5, 1948 |
| 2,455,182 | Valee | Nov. 30, 1948 |
| 2,484,588 | Richard | Oct. 11, 1949 |
| 2,485,115 | Saunders | Oct. 18, 1949 |
| 2,511,126 | Philipp | June 13, 1950 |
| 2,511,419 | Smith | June 13, 1950 |
| 2,529,734 | Lehmann | Nov. 14, 1950 |
| 2,539,613 | Earle | Jan. 30, 1951 |
| 2,541,145 | Bader | Feb. 13, 1951 |